US012086709B2

(12) United States Patent
Olsen et al.

(10) Patent No.: US 12,086,709 B2
(45) Date of Patent: Sep. 10, 2024

(54) MACHINE-LEARNING BASED SYSTEM FOR VIRTUAL FLOW METERING

(71) Applicant: ConocoPhillips Company, Houston, TX (US)

(72) Inventors: Christopher S. Olsen, Houston, TX (US); Douglas Hakkarinen, Houston, TX (US); Christopher R. Zaremba, Calgary (CA); Everett Robinson, Calgary (CA); Morgan Cowee, Houston, TX (US); R. James Provost, Calgary (CA)

(73) Assignee: CONOCOPHILLIPS COMPANY, Houston, TX (US)

( * ) Notice: Subject to any disclaimer, the term of this patent is extended or adjusted under 35 U.S.C. 154(b) by 657 days.

(21) Appl. No.: 17/027,321

(22) Filed: Sep. 21, 2020

(65) Prior Publication Data

US 2021/0089905 A1   Mar. 25, 2021

Related U.S. Application Data

(60) Provisional application No. 62/903,414, filed on Sep. 20, 2019, provisional application No. 62/902,636, filed on Sep. 19, 2019.

(51) Int. Cl.
*G06N 3/08* (2023.01)
*G06N 3/04* (2023.01)

(52) U.S. Cl.
CPC .............. *G06N 3/08* (2013.01); *G06N 3/04* (2013.01)

(58) Field of Classification Search
CPC .... G06N 3/08; G06N 3/084; G06N 5/01; G06N 3/088; G06N 3/094; G06N 3/092;
(Continued)

(56) References Cited

U.S. PATENT DOCUMENTS

2008/0208782 A1   8/2008   Weiss
2008/0306892 A1*  12/2008  Crossley ............... G01F 1/74
                                                    706/16

(Continued)

OTHER PUBLICATIONS

International Search Report and Written Opinion for International Application No. PCT/US2020/051821 mailed Dec. 15, 2020, 10 pages.

(Continued)

*Primary Examiner* — Kidest Bahta
(74) *Attorney, Agent, or Firm* — Polsinelli PC

(57) ABSTRACT

Various aspects described herein relate to a system that utilized deep learning and neural networks to estimate/predict an amount of natural resource production in a well given a set of parameters indicative of physical changes to the well. In one aspect, a virtual flow meter includes memory having computer-readable instructions stored therein and one or more processors configured to execute the computer-readable instructions to receive one or more input parameters indicative of physical changes to at least one well; apply the one or more input parameters to a trained neural network architecture; and determine one or more outputs of the trained neural network architecture, the one or more outputs corresponding to predicted fluid output of the at least one well.

18 Claims, 7 Drawing Sheets

(58) Field of Classification Search
CPC .......... G06N 3/091; G06N 3/09; G06N 3/096; G06N 5/02; G06N 20/00; G06N 3/004; G06N 3/02
See application file for complete search history.

(56) References Cited

U.S. PATENT DOCUMENTS

| | | | |
|---|---|---|---|
| 2009/0114445 A1* | 5/2009 | Dashevskiy | ............ E21B 44/00 |
| | | | 702/9 |
| 2009/0223487 A1* | 9/2009 | Dingle | ................ F02M 57/005 |
| | | | 701/103 |
| 2010/0088076 A1 | 4/2010 | Koutsabeloulis et al. | |
| 2010/0138368 A1 | 6/2010 | Stundner et al. | |
| 2012/0043081 A1* | 2/2012 | Kjorholt | ............ E21B 43/2406 |
| | | | 166/52 |
| 2014/0326063 A1* | 11/2014 | Lovell | ................... E21B 47/103 |
| | | | 73/152.33 |
| 2015/0051892 A1* | 2/2015 | Carvajal | ................. G06N 3/10 |
| | | | 703/10 |
| 2018/0087360 A1 | 3/2018 | Conn et al. | |
| 2019/0024494 A1* | 1/2019 | Maher | ................... E21B 43/006 |
| 2020/0209428 A1* | 7/2020 | El-Bakry | ............... G01V 20/00 |

OTHER PUBLICATIONS

Extended European Search Report for Application No. 20866181.9 dated Sep. 8, 2023 (10 pages).

* cited by examiner

MACHINE-LEARNING BASED SYSTEM FOR VIRTUAL FLOW METERING

CROSS-REFERENCE TO RELATED APPLICATIONS

The present application claims priority to U.S. Provisional Application No. 62/902,636; filed Sep. 19, 2019 and U.S. Provisional Application No. 62/903,414; filed Sep. 20, 2019 both entitled "Machine-Learning Based System For Virtual Flow Metering", which are specifically incorporated by reference in its entirety herein.

BACKGROUND

1. Field of The Invention

Aspects of the present disclosure generally relate to measuring flow rates in a producing well and more specifically to a machine learning based model that determines production flow rates of a well given parameters indicative of physical changes to the well.

2. Discussion of Related Art

Optimization of producing wells is an ever present challenge to well operators who try to maximize and optimize the rate of natural resource production from such wells. Due to high costs of testing equipment and facilities, not every producing well can have its own test separator for periodic well tests to determine a rate of production of natural resources. Furthermore, with less frequent testing being sufficient for regulatory compliance, there is less incentive to determine and optimize production behavior of a well on finer time scales than a week, a month etc.

Accordingly, alternative structures are needed to study and optimize the production behavior of a producing well.

BRIEF DESCRIPTION OF THE DRAWINGS

In order to describe the manner in which the above-recited and other advantages and features of the disclosure can be obtained, a more particular description of the principles briefly described above will be rendered by reference to specific example embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
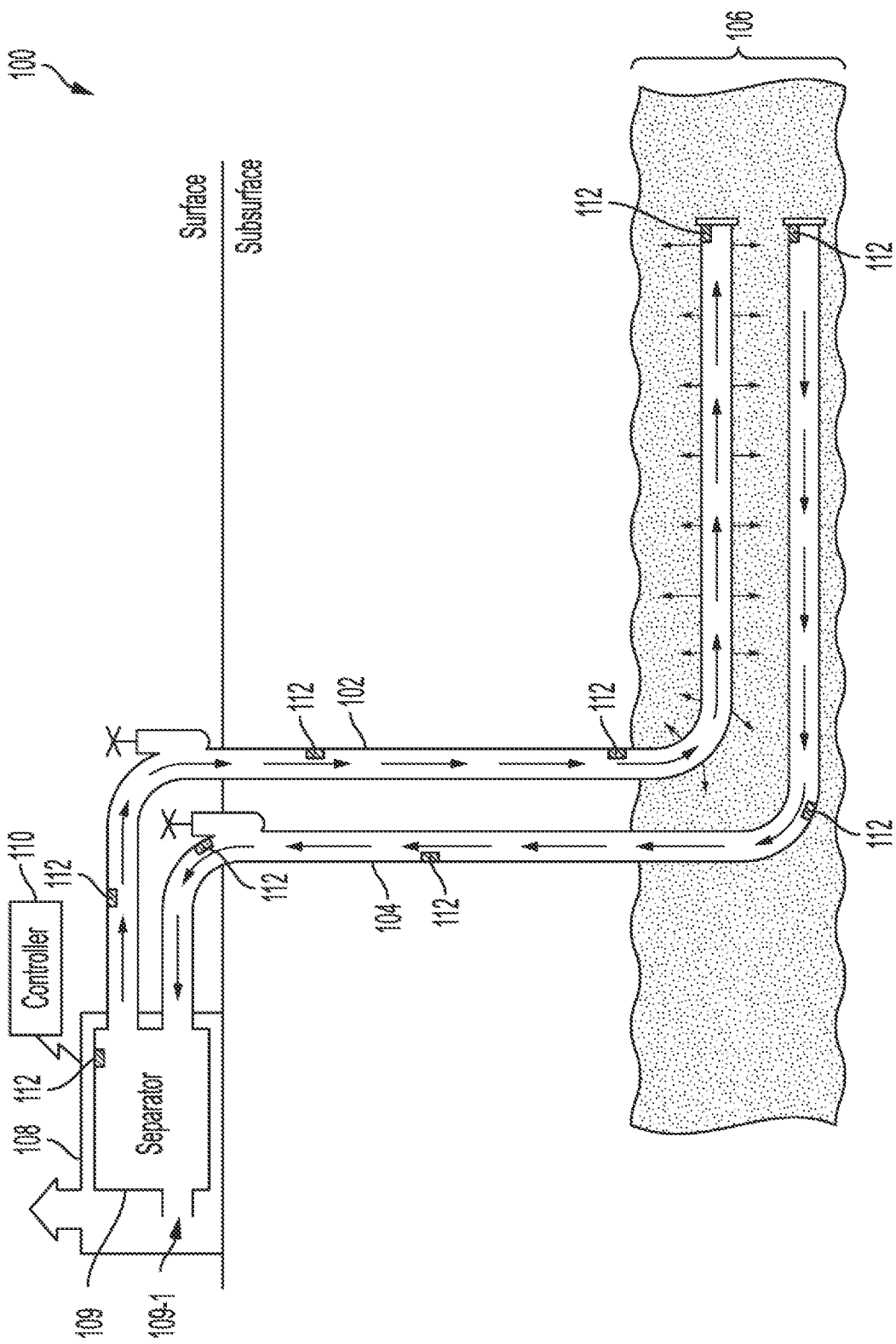
FIG. 1 illustrates an example well, according to an aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example embodiment in the present disclosure can be references to the same example embodiment or any example embodiment; and, such references mean at least one of the example embodiments.

Reference to "one embodiment" or "an embodiment" means that a particular feature, structure, or characteristic described in connection with the example embodiment is included in at least one example embodiment of the disclosure. The appearances of the phrase "in one embodiment" in various places in the specification are not necessarily all referring to the same example embodiment, nor are separate or alternative example embodiments mutually exclusive of other example embodiments. Moreover, various features are described which may be exhibited by some example embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

SUMMARY

The present disclosure provides an improvement to conventional methods of testing well pair production at predetermined test times using test separators, a process by which the amount of natural resources (oil, gas, water, etc.) produced/extracted from a producing well is/are separated. The improvement is provided by a system that utilized deep learning and neural networks to estimate/predict an amount of natural resource production in a well given a set of parameters indicative of physical changes to the producing well (e.g., amount of injected steam/water/gas, lift rates, pressures, set points, modes, conditions, etc.) The estimation provides a more accurate view of the production rate of the well on a finer time scale relative to conventional periodic test separator processes performed at a surface testing facility, which can effectively be referred to as a virtual flow meter.

In one aspect, a virtual flow meter includes memory having computer-readable instructions stored therein and one or more processors configured to execute the computer-readable instructions to receive one or more input parameters indicative of physical changes to at least one well; apply the one or more input parameters to a trained neural network architecture; and determine one or more outputs of the trained neural network architecture, the one or more outputs corresponding to predicted fluid output of the at least one well.

In another aspect, the one or more inputs include a rate of injection into the injector well, a change in well pressure, a lift rate, a mode of operation, temperature of the at least one well, operational history of the at least one well, and completion metadata of the at least one well.

In another aspect, the one or more processors are configured to execute the computer-readable instructions to train the neural network architecture prior to receiving the one or more inputs.

In another aspect, the one or more processors are configured to execute the computer-readable instructions to train the neural network architecture using data collected for the at least one well over a period of time.

In another aspect, the one or more processors are configured to execute the computer-readable instructions to detrend the data by subtracting off a value of a sequence endpoint from all other points in the sequence.

In another aspect, the one or more processors are configured to execute the computer-readable instructions to normalize the data after detrending using minimum and maximum values of all sequences of the data.

In another aspect, the one or more processors are configured to execute the computer-readable instructions to optimize the trained neural network architecture using a dynamic programing optimization method and the one or more outputs.

In another aspect, the one or more outputs include an oil production rate and a water production rate.

In another aspect, the virtual flow meter is accessible via a terminal by an operator of the at least one well.

In another aspect, the at least one well is a steam assisted gas drainage well pair.

In one aspect, a method of operating a virtual flow meter includes receiving one or more input parameters indicative of physical changes to a at least one well; applying the one or more input parameters to a trained neural network architecture; and determining one or more outputs of the trained neural network architecture, the one or more outputs corresponding to predicted fluid output of the at least one well.

In another aspect, the one or more inputs include a rate of injection into the injector well, a change in well pressure, a lift rate, a mode of operation, temperature of the at least one well, operational history of the at least one well, and completion metadata of the at least one well.

In another aspect, the method further includes training the neural network architecture prior to receiving the one or more inputs.

In another aspect, the neural network architecture is trained using data collected for the at least one well over a period of time.

In another aspect, the training includes detrending the data by subtracting off a value of a sequence endpoint from all other points in the sequence.

In another aspect, the method further includes normalizing the data after detrending using minimum and maximum values of all sequences of the data.

In another aspect, the method further includes optimizing the trained neural network architecture using a dynamic programing optimization method and the one or more outputs.

In another aspect, the one or more outputs include an oil production rate and a water production rate.

In another aspect, the virtual flow meter is accessible via a terminal by an operator of the at least one well.

In another aspect, the at least one well is a steam assisted gas drainage well pair.

Description of Example Embodiments

The disclosure begins with a description of an example production well, in which the methods and systems of the present disclosure may be implemented.

FIG. 1 illustrates an example well, according to an aspect of the present disclosure. FIG. 1 illustrates an example of a well setting operating based on Steam Assisted Gravity Drainage (SAGD). However, it should be noted that example embodiments of a neural network based virtual flow meter described herein are not limited to SAGD based wells but can be applied to any other type of well, constructed and utilized for production and extraction of natural resources. Examples of other types of wells include, but are not limited to, waterflood reservoirs, unconventional reservoirs such as tight-gas sands, gas and oil shales, coalbed methane, heavy oil and tar sands, and gas-hydrate deposits, etc.

FIG. 1 illustrates a simplified version of a SAGD based producing well setting 100. Setting 100 includes two wells 102 and 104, which may be referred to as a well pair 102/104. Well 102 is referred to as an injection well while well 104 is referred to as a producing well. Each of wells 102 and 104 may have associated pumps 102-1 and 104-1 that can be controlled (e.g., manually, electronically, remotely, etc.) to control flow of steam/natural resources in respective wells. Each well may have more than 1 associated pump.

As known to those skills in the art, natural resources may sometimes be located deep below the surface in a layer that may be referred to as Bitumen layer 106. Natural resources (Bitumen) existing in this layer may typically be dense and heavy enough such that it cannot be pumped back to the surface. Accordingly, steam is injected into layer 106 via injection well 102 and warms the near solid particles containing natural resources, which are then pumped back to the surface via producing well 104. In another example, in combination with or instead of steam, water, gas or any other suitable substance (or different phases of any one of a number of substances) may be injected into layer 106. The liquid pumped to the surface via producing well 104 contains gas, oil, water, etc., which are brought to processing center 108, where via any known or to be developed method, is processed to extract the natural resources for further use while the water included may be processed and reused in the next/subsequent round of steaming via injection well 102. For example, processing center 108 may have one or more separators 109 that can be used to separate bitumen (oil and gas) from the water mixed within, which can then be pumped out via output 109-1 to be processed and used for underlying applications (e.g., vehicle fuel, jet fuel, plastic by products, etc.).

Processing center 108 may also include a controller 110, which may be connected to various components (using known or to be developed wired and/or wireless communication schemes) of setting 100 to monitor and control operation of well pair 102/104. Controller 110 that includes one or more processing units for processing data and conveying the same to well operators and/or receive instructions for operation of setting 100. In one example, controller 110 may be remote relative to setting 100 and may be communicatively coupled to various components of setting 100.

Setting 100 of FIG. 1 illustrates a number of additional components 112. Components 112 may be any type of known or to be developed sensors (pressure, temperature, flow sensors), thermocouples, etc. used at various locations along injection well 102, producing well 104, both on inner sides and/or outer perimeters of well pairs 102/104, processing center 108 to collect and measure various physical parameters (e.g., temperature, pressure, steam rate, etc.). These additional components may be collectively referred to as sensors 112. Sensors 112 may be communicatively coupled to controller 110.

FIG. 1 illustrates a simplified SAGD well setting 100. However, such setting may include any number of additional elements and components (e.g., sensors, pumps, monitoring devices, etc.), known or to be developed, used in operating well setting 100.

While FIG. 1 and the remaining Figures below are described with reference to a pair of injector/producing wells such as pair of wells 102/104, the present disclosure is not limited to a pair of well and the trained neural networking for virtual flow metering concept can be applied to a single well such as a producing well and/or any other unconventional reservoirs with non-limiting examples of which provided above.

With an example well setting described with reference to FIG. 1, the disclosure now turns to a process for training a neural network that can be deployed to function as a virtual flow meter.

Figure 2:
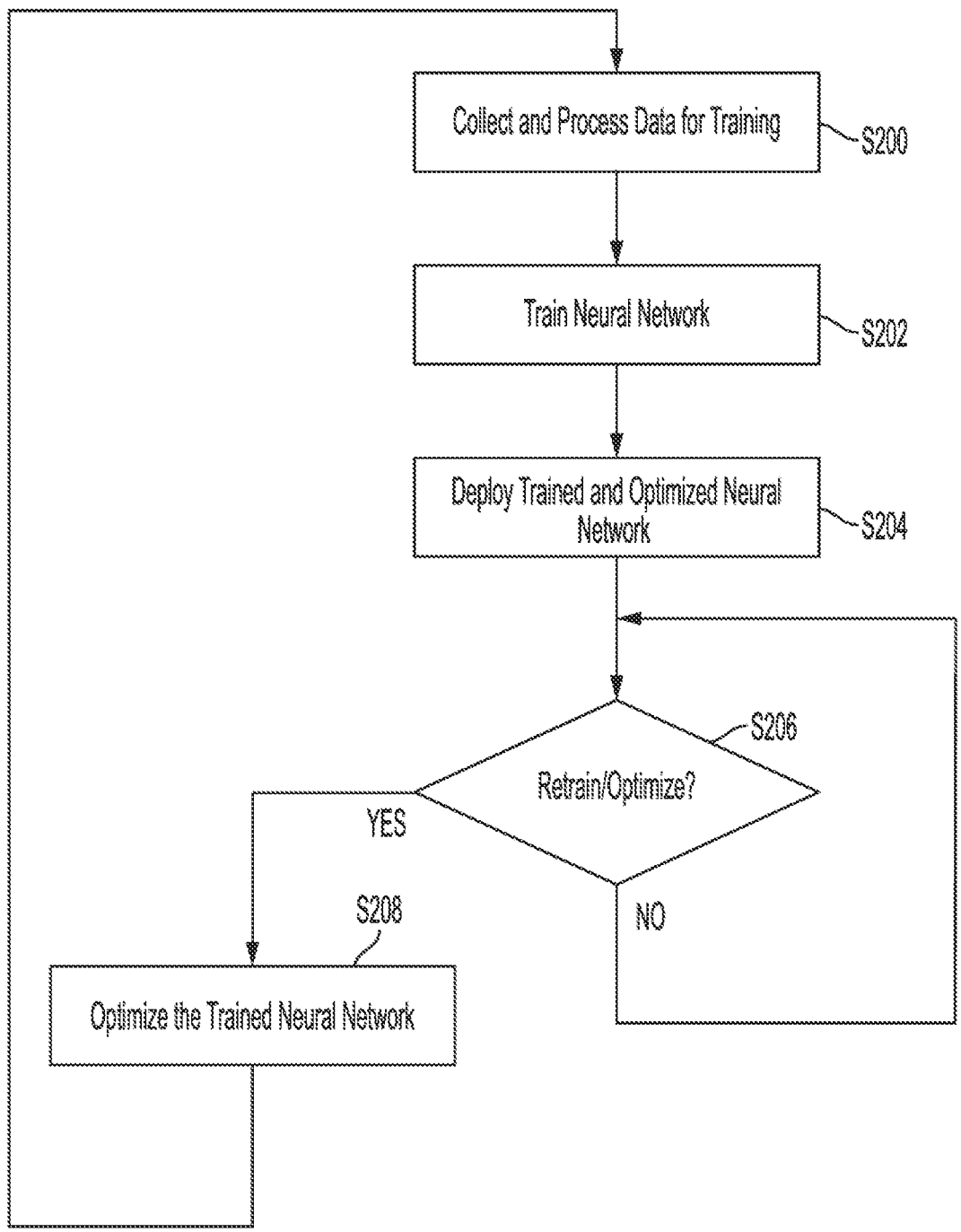
FIG. 2 describes an example process for training a neural network of FIG. 2, according to an aspect of the present disclosure.

FIG. 2 describes an example process for training a neural network of FIG. 2, according to an aspect of the present disclosure. FIG. 2 will be described from perspective of controller 110 of FIG. 1. However, it will be understood that controller 110 has one or more associated memories with computer-readable instructions stored therein, which when executed by one or more processors of controller 110, configure controller 110 to perform the functions described below with reference to FIG. 2. Alternatively, another computing system that may be remotely located (e.g., in a lab) relative to setting 100 may be used for building and training the virtual flow meter to be deployed at controller 110 for implementation thereafter.

At S200, controller 110 collects and processes data for training a neural network. In one example sources of such data includes, but is not limited to, data retrieved from reservoir engineering databases, PI historian, ArcGIS, data collected by sensors 112 (and stored in a database associated with controller 110) such as per minute injection and production data for well pair 102/104, hourly injection and production data for well pair 102/104, temperatures, steam/emulsion data, setpoints and subsurface data.

As part of training the neural network, data may be provided as a sequence of inputs. For example, each set of data corresponding to a different parameter (e.g., lift rate or steam rate) can be provided as a sequence of numbers. In one example, controller 110 may initially detrend the data by subtracting off a value of a sequence endpoint from all other points in the sequence followed by normalizing the data using minimum and maximum values of all sequences of the same data.

In one example and for training purposes, not only data from well pair 102/104 is used but similar data from other nearby wells or any other number of well pairs may be used.

In some instances, the data used for training may have missing components, be incomplete, etc. Accordingly, as part of processing the data, controller 110 may standardize, interpolate and/or use any other known or to be developed technique for standardizing the data and accommodate for missing components of the data.

In one example, data selected and processed at S200 may be data collected over a threshold period of time (e.g., 6 months, a year, 5 years, etc.), where such threshold period of time is a configurable parameter determined based on experiments and/or empirical studies.

At S202, controller 110 trains a neural network (will be described below with reference to FIGS. 3A-3C) using the data and field tests.

Thereafter, at S204, controller 110 deploys the optimized and trained neural network for predicting/estimating changes to production rate of oil, gas, water, a water cut rate, a total liquid/emulsion rate, etc. from well setting 100 in response to physical changes to well setting 100 at the surface, as will be described below.

At S206, controller 110 determines if the trained neural network should be retrained/optimized. Retraining of the neural network may be performed periodically (where such periodicity is determined based on experiments and/or empirical studies (e.g., every week, every month, every 6 months, etc.). Alternatively, as soon as controller 110 receives new test field data and measurements (which may also be received periodically), controller 110 determines that the trained neural network should be retrained/updated, where the process of S200, S202 and S206 are repeated.

In another example, every time the trained neural network is deployed and well outputs are predicted/estimated, the predicted outputs/estimates are used for retraining and optimizing the neural network.

If at S206, controller 110 determines that the trained neural network should not be retained/optimized, S206 is repeated until controller 110 determines that the trained neural network should be optimized.

If at S206, controller 110 determines that the trained neural network should be retained/optimized, then at S208, controller 110 optimizes the trained neural network using any known or to be developed optimization technique (e.g., a constrained optimization technique such as dynamic programming). According to one implementation of dynamic programming, several steam settings for multiple well pairs (e.g., steam injection rates) are passed into the trained neural network to predict how much oil/gas/water is produced in a corresponding well in response to such steam settings. The predicted production of oil/gas/water are then ranked and only a subset thereof are taken for each well pair. In another example, real-work/real-time outputs (predictions/estimates) of using the trained neural network in the field are analyzed and ranked and used to make any necessary adjustments/fine tuning to parameters of the underlying neural network. This process is repeated until a combination of steam settings and predicted oil/gas/water production for a well pair are found that yield the most oil using at least a threshold percentage of all available steam (e.g., 90%).

Thereafter, the process reverts back to S200 and steps are FIG. 2 are repeated.

Figure 3A:
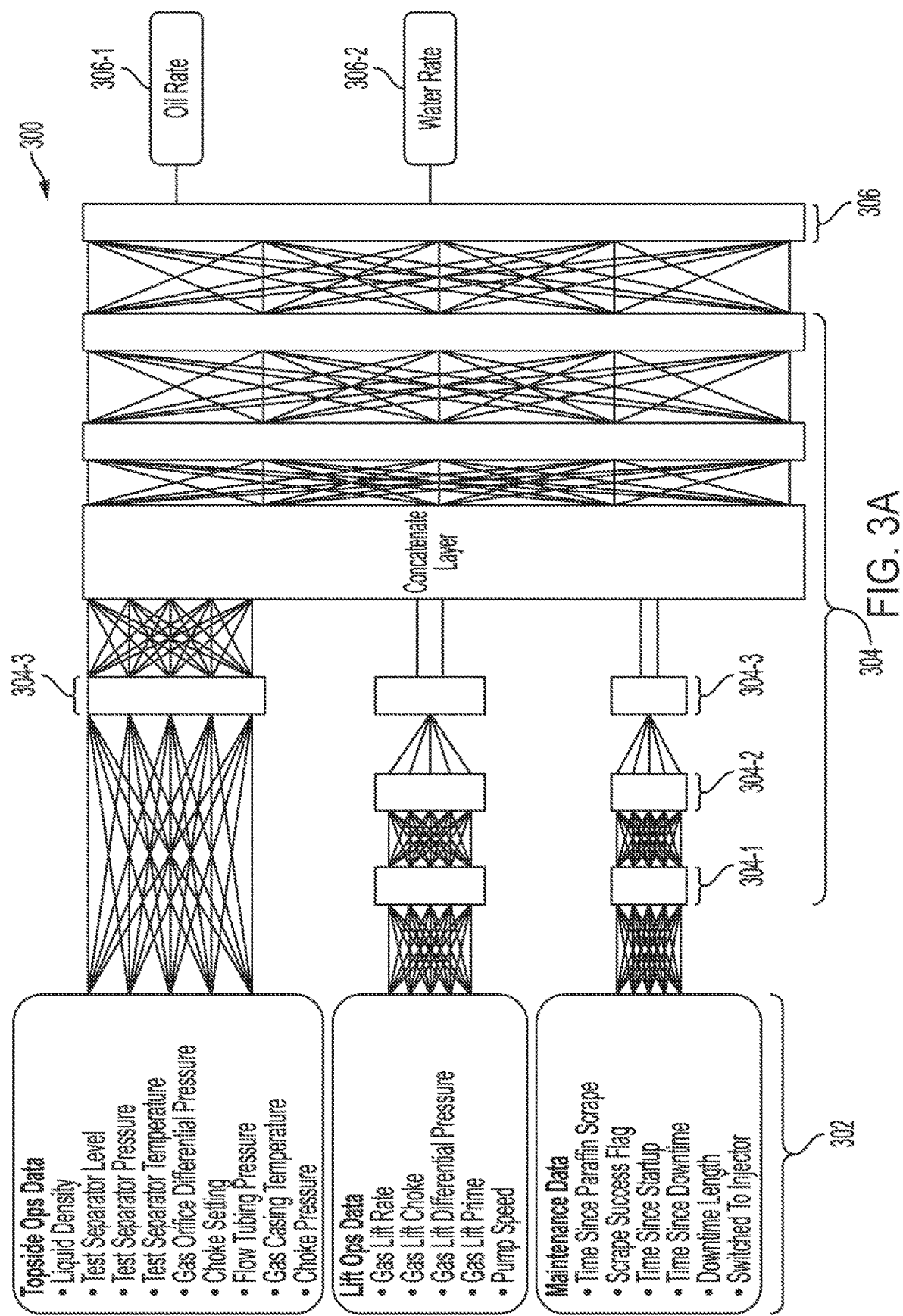
FIGS. 3A-3C illustrate example configurations of neural networks trained using the process of FIG. 2, according to one aspect of the present disclosure.
Figure 3B:
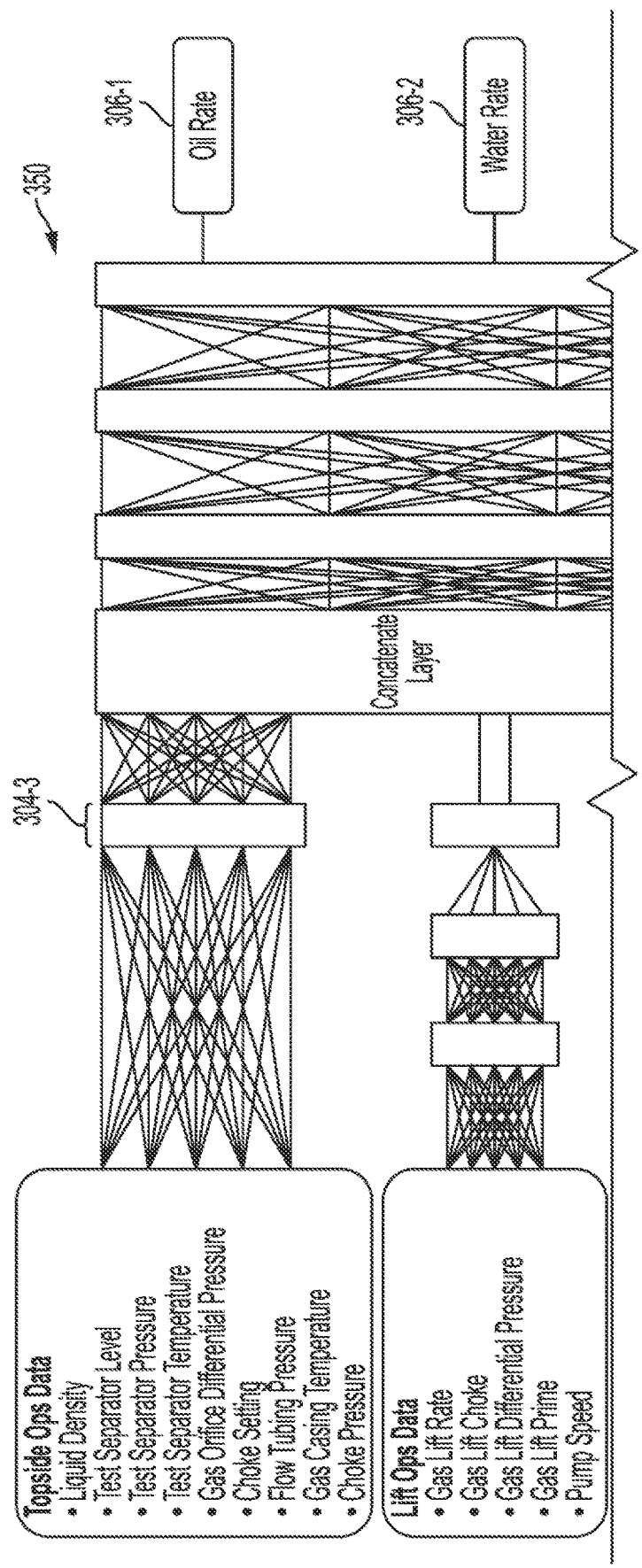
Figure 3C:
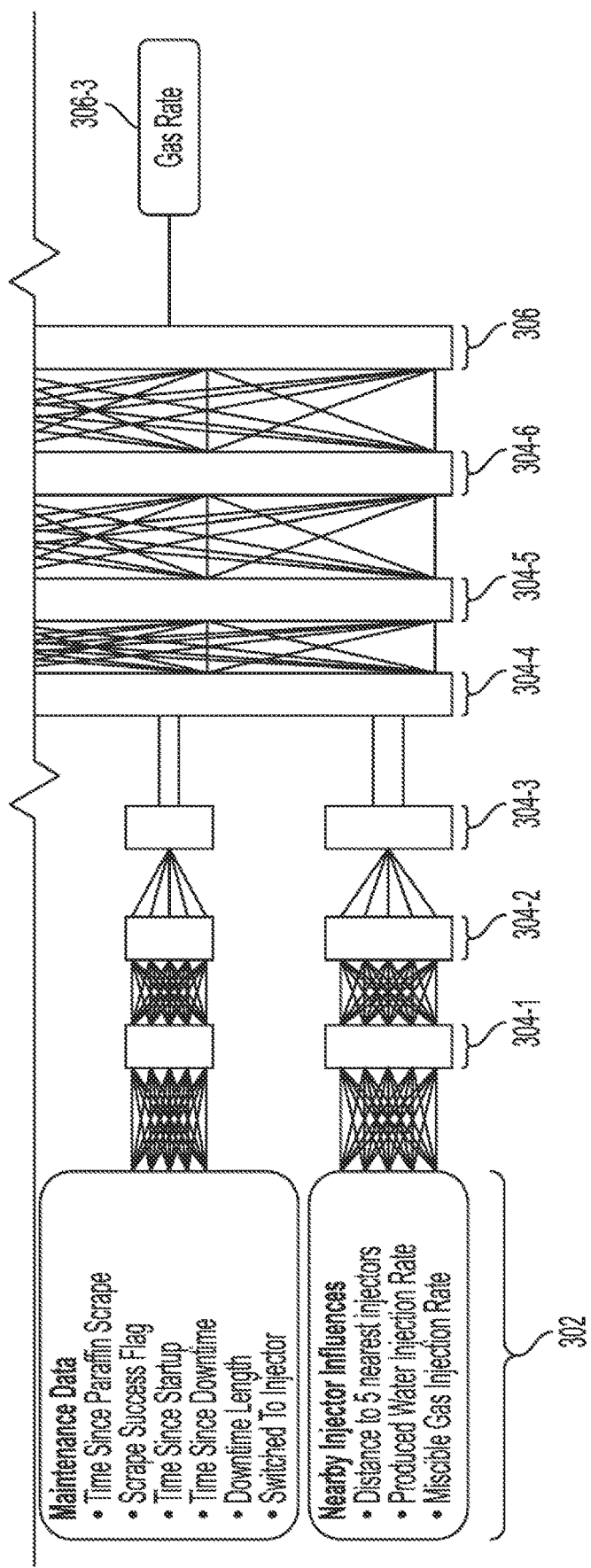

FIGS. 3A-3C illustrate an example configurations of neural networks trained using the process of FIG. 2, according to one aspect of the present disclosure. First a generic description of structure and operation of a neural network is provided before presenting examples of particular structures and architectures of neural networks used in the present disclosure.

A neural network architecture (NNA) may include an input layer, through which input data is provided to the neural network such as parameters indicative of physical change to well pair 202/204 (e.g., steam rate, lift rate, etc., as will be further described below). An input layer can have m number of nodes, where m is equal to or greater than one.

A neural network can also include one or more hidden layers thus providing a single or multi-layer neural network architecture. A number of hidden layers of a neural network may be selected to achieve various levels of architectures and complexities as needed for an underlying application. Each hidden layer can have a p number of nodes, where p is equal to or greater than one.

A neural network also includes an output layer that provides an output resulting from the processing performed by hidden layer(s) on input data received at input layer. In this instance, the output layer can provide rates of natural resource (e.g., oil, gas, water) production as a result of injected steam. Output layer can have q number of nodes, where q is equal to or greater than one.

Any number of nodes at any given layer of a neural network may be connected to one or more nodes at a different layer of neural network. In one example, each node in input layer is connected to every node in hidden layer(s) and every node in hidden layer(s) is connected to output node at output layer.

Information associated with nodes of a neural network may be shared among the different layers and each layer retains information as information is processed. In some cases, a neural network can include a feed-forward network, in which case there are no feedback connections where outputs of the network are fed back into itself. In some cases, neural network can include a recurrent neural network, which can have loops that allow information to be carried across nodes while reading in input.

Information can be exchanged between nodes through node-to-node interconnections between the various layers. Nodes of an input layer can activate a set of nodes in hidden layer.

Nodes of any hidden layer can transform the information of each input node by applying activation functions to the information. The information derived from the transformation can then be passed to and can activate nodes of the next layer (e.g., node of a subsequent hidden layer or an output layer).

In some cases, each node or interconnection between nodes can have a weight that is a set of parameters derived from the training of neural network. For example, an interconnection between nodes can represent a piece of information learned about the interconnected nodes. The interconnection can have a numeric weight that can be tuned (e.g., based on a training dataset), allowing a neural network to be adaptive to inputs and able to learn as more data is processed.

In some cases, a neural network can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training data until a NNA is trained enough so that the weights of the layers are accurately tuned.

A loss function can be used to analyze errors in the output. Any suitable loss function definition can be used. The loss (or error) can be high for the initial training data since the actual values will be different than the predicted output. The goal of training is to minimize the amount of loss so that the predicted output is the same as the training label. A neural network can perform a backward pass by determining which inputs (weights) most contributed to the loss of the network, and can adjust the weights so that the loss decreases and is eventually minimized.

A derivative of the loss with respect to the weights can be computed to determine the weights that contributed most to the loss of the network. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

With a general structure of a NNA described above, FIG. 3A illustrates an example neural network 300 with input layer 302, multiple hidden layers 304 (304-1, 304-2, 304-3, 3044, 304-5 and 304-6) and output layer 306 (which provides oil production rate 306-1 and water production rate 306-2 as examples). While not shown, output layer 306 can also provide gas production rate (as will be shown with reference to neural network 350 of FIG. 3B), a water cut rate, a total liquid/emulsion rate as outputs as will be shown with reference to neural network 350 of FIG. 3B.

As mentioned above with reference to FIG. 2 and shown in FIG. 3A, inputs provided to nodes at input layer 302 include, but are not limited to, data associated with any one or more of well pair 202/204 and/or any other nearby well, an unconventional reservoir, etc. Non-limiting examples of such data can be indicative of topside operation data such as temperature, operational history, maintenance history, completion metadata, and nearby well production data, liquid density, test separator level, test separator pressure, test separator temperature, gas orifice differential pressure, choke setting, flow tubing pressure, gas casing temperature, choke pressure, etc. Inputs further include lift operations data such as head/toe gas lift rates, gas lift choke, gal lift differential pressure, gas lift prime and pump speed. Moreover, the inputs can also include maintenance data such as time since paraffin scrape, scrape success flag, time since startup, time since downtime, downtime length and switch to injector. The types and number of input data are not limited to those described herein and may include any other additional data related to operation of well setting 100 and/or hardware and software components operating therein.

As shown in FIG. 3A, each of topside operations data, lift operations data and maintenance data may be provided as inputs to different sub neural networks, the output of each of which is fed to hidden layer 304-4 referred to as a concatenate layer. In other words and as can be observed from FIG. 3A, not every node of input layer 302 is connected to every other node of hidden layers 304-1, 304-2 and 304-3 but instead to a subset of those nodes. Similarly, not every node of hidden layers 304-1, 304-2, 304-3 and 304-4 are connected to one another. On the other hand, every node of hidden layer 304-4 is connected to every node of hidden layer 304-5, every node of hidden layer 304-5 is connected to every node of hidden layer 304-6 and every node of hidden layer 304-6 is connected to every node of output layer 206.

FIGS. 3A-3C provides another example of a neural network that can be trained according to process of FIG. 2 and deployed. Relative to neural network 300 of FIG. 3A, neural network 350 of FIG. 3B has additional data input related to other nearby wells and their influence on a given well pair such as well pair 102/104. More specifically, at input layer 302, additional category at input layer 302, referred to as nearby injector influences that can include data such as distance to a number (e.g., 5) nearest injector wells, produced water injection rate at nearby well pairs, miscible gas injection rate at nearby well pairs, other producing wells influencing production/flow at well pair 102/104 etc. In addition, neural network 350 is different from neural network 300 in that a number of nodes at hidden layers 304-1, 304-2 and 304-3 are different (more) than the number of nodes at hidden layers 304-1, 304-2 and 304-3 in neural network 300. Furthermore, output layer 306 of neural network 350 provides gas rate 306-3 as an additional output compared to neural network 300.

With a trained neural network 300/350 as described above with reference to FIGS. 2 and 3A-3C the disclosure now turns to the process of deploying the trained neural network as a virtual flow meter.

Figure 4:
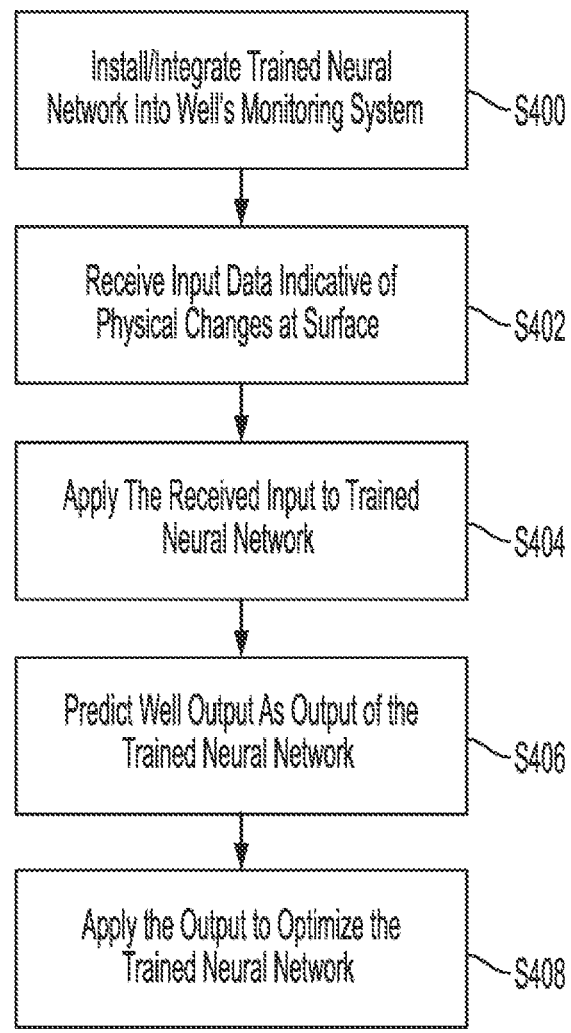
FIG. 4 is an example process of deploying the trained neural network of FIGS. 3A-3C functioning as a virtual flow meter, according to an aspect of the present disclosure.

FIG. 4 is an example process of deploying the trained neural network of FIGS. 3A-3C functioning as a virtual flow meter, according to an aspect of the present disclosure. FIG. 4 will be described from perspective of controller 110 of FIG. 1. However, it will be understood that controller 110 has one or more associated memories with computer-readable instructions stored therein, which when executed by one or more processors of controller 110, configure controller 110 to perform the functions described below with reference to FIG. 4.

At S400, controller 110 installs and/or integrates the trained neural network into operating/monitoring system of well setting 100.

At S402, controller 110 receives inputs to the trained neural network via a user interface available to an operator on a terminal (e.g., a desktop, a tablet, etc.) connected to controller 110. In one example, inputs may be any of several parameters indicative of physical changes to a pair of wells such as well pair 102/104. As noted these parameters indicate changes at the surface to operation of the well pair such as steam rate, lift rate and/or any other parameter described above. While in one example, the inputs can be indicative of physical changes to a pair of wells such as well pair 102/104, the present disclosure is not limited thereto. In another example, the inputs can be indicative of physical changes to a well such as a nearby producing well and/or are indicative of physical changes to unconventional reservoir(s) with producing wells, etc.

At S404, controller 110, taking the inputs received at S402, executes the trained neural network and applies the inputs thereto in order to determine one or more outputs such as one or more of oil production rate, water production rate, gas production rate, a water cut rate, a total liquid/emulsion rate, etc., as described above.

At S406, controller 110 determines one or more outputs of the trained neural network, where such outputs are predicted output of the well pair 102/104 (output from producing well 104) in response to such surface changes received as inputs at S402. Such predicted outputs include, but are not limited to, oil production rate, water production rate, gas production rate, a water cut rate, a total liquid/emulsion rate, etc., produced from underground bitumen at layer 106 of FIG. 1.

At S408, controller 110 applies outputs at S406 to optimize the trained neural network per S208 of FIG. 2 as described above.

With examples of a trained neural network for predicting changes in output of well setting 100 in response to changes in parameters indicative of physical changes described above with reference to FIGS. 1-4, the disclosure now turns to example computing systems and components that can be used as any one or more of controller 110 and/or any terminal used for controlling/monitoring well setting 100. Moreover, additional detail and variations of example embodiments described above with reference to FIGS. 1-4 are described by Olsen at al. in "A Data Driven Approach for Steam Allocation Optimization at Surmont," attached hereto and incorporated by reference in its entirety.

Figure 5:
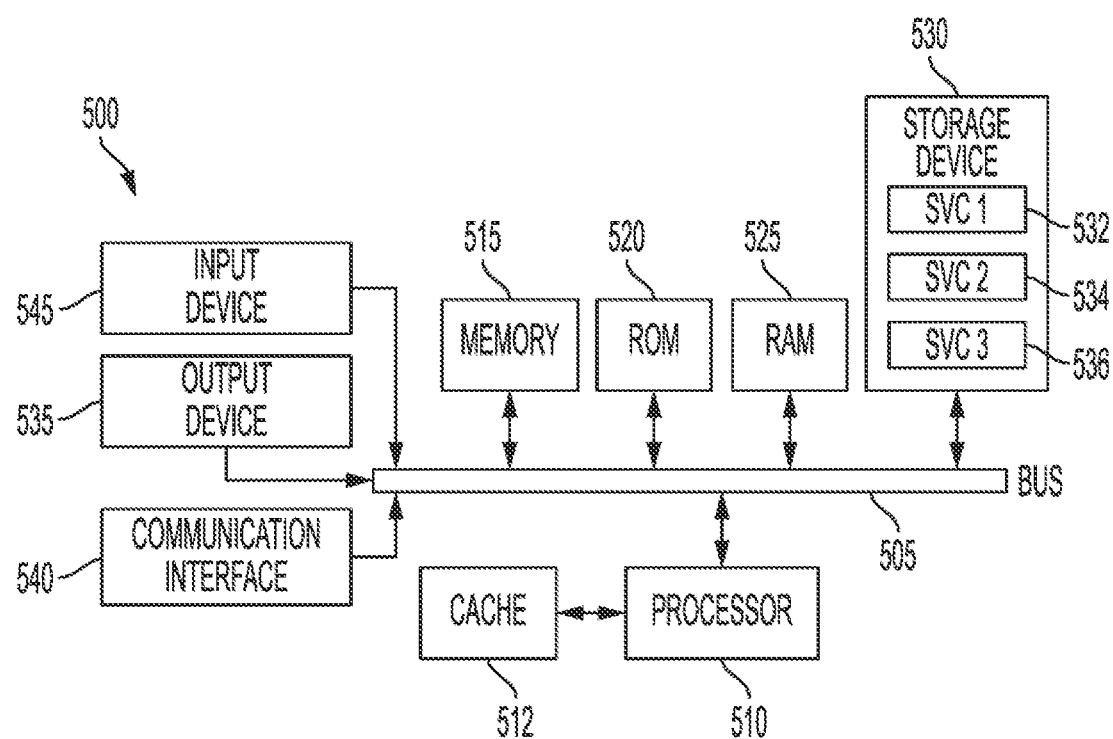
FIG. 5 illustrates an example computing system, according to one aspect of the present disclosure.

FIG. 5 illustrates an example computing system, according to one aspect of the present disclosure. System 500 can include components in electrical communication with each other using a connection 505, such as a bus. System 500 includes a processing unit (CPU or processor) 510 and connection 505 that couples various system components including the system memory 515, read only memory (ROM) 520 and/or random access memory (RAM) 525, to the processor 510. System 500 can include a cache 512 of high-speed memory connected directly with, in close proximity to, or integrated as part of processor 510. System 500 can copy data from memory 515 and/or storage device 530 to cache 512 for quick access by processor 510. In this way, cache 512 can provide a performance boost that avoids processor 510 delays while waiting for data. These and other modules can control or be configured to control processor 510 to perform various actions. Other system memory 515 may be available for use as well. Memory 515 can include multiple different types of memory with different performance characteristics. Processor 510 can include any general purpose processor and a hardware or software service, such as service 1 532, service 2 534, and service 3 536 stored in storage device 530, configured to control processor 510 as well as a special-purpose processor where software instructions are incorporated into the actual processor design. Processor 510 may be a completely self-contained computing system, containing multiple cores or processors, a bus, memory controller, cache, etc. A multi-core processor may be symmetric or asymmetric.

To enable user interaction with system 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with system 500. Communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include service 1 532, service 2 534 and/or service 3 536 for execution by processor 510 to cause processor 510 to carryout functionalities described above with reference to FIGS. 1-4. Other hardware or software modules are contemplated. Storage device 530 can be connected to connection 505. In one aspect, a hardware module that performs a particular function can include the software component stored in a computer-readable medium in connection with the necessary hardware components, such as processor 510, connection 505, output device 535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items in the claims and/or specification refers to any combination of those items, including single members or multiple members. As an example, "at least one of a, b, and c" is intended to cover a; b; c; a and b; a and c; b and c; or a, b and c.

What is claimed is:

1. A virtual flow meter, comprising:
memory having computer-readable instructions stored therein; and
one or more processors configured to execute the computer-readable instructions to:
receive one or more input parameters indicative of one or more physical changes to an injector well from a user interface, the one or more input parameters including a rate of injection into the injector well, a change in well pressure of the injector well, a lift rate, a mode of operation, a temperature of the injector well, operational history of the injector well, and completion metadata of the injector well;
apply the one or more input parameters to a trained neural network architecture;
determine one or more outputs of the trained neural network architecture, the one or more outputs corresponding to a predicted fluid output of a producing well; and
indicate, via an output device, the one or more outputs.

2. The virtual flow meter of claim 1, wherein the one or more processors are configured to execute the computer-readable instructions to train the trained neural network architecture prior to receiving the one or more input parameters.

3. The virtual flow meter of claim 2, wherein the one or more processors are configured to execute the computer-readable instructions to train the trained neural network architecture using data collected for the injector at least one well over a period of time.

4. The virtual flow meter of claim 3, wherein the one or more processors are configured to execute the computer-readable instructions to detrend the data by subtracting off a value of an endpoint of a sequence from all other points in the sequence.

5. The virtual flow meter of claim 3, wherein the one or more processors are configured to execute the computer-readable instructions to normalize the data after detrending using minimum and maximum values of all sequences of the data.

6. The virtual flow meter of claim 2, wherein the one or more processors are configured to execute the computer-readable instructions to optimize the trained neural network architecture using a dynamic programing optimization method and the one or more outputs.

7. The virtual flow meter of claim 1, wherein the one or more outputs include an oil production rate and a water production rate.

8. The virtual flow meter of claim 1, wherein the virtual flow meter is accessible via a terminal by an operator of the injector ell.

9. The virtual flow meter of claim 1, wherein the injector well and the producing well are a steam assisted gas drainage well pair.

10. A method of operating a virtual flow meter, comprising:
   receiving, via a user interface, one or more input parameters indicative of physical changes to an injector well, the one or more input parameters including a rate of steam injection into the injector well, a change in well pressure of the injector well, a lift rate, a mode of operation, a temperature of the injector well, operational history of the injector well, and completion metadata of the injector well;
   applying the one or more input parameters to a trained neural network architecture;
   determining one or more outputs of the trained neural network architecture, the one or more outputs corresponding to predicted fluid output of a producing the at least one well; and
   indicating, via an output device, the one or more outputs.

11. The method of claim 10, further comprising:
   training the trained neural network architecture prior to receiving the one or more input parameters.

12. The method of claim 11, wherein the trained neural network architecture is trained using data collected for the injector well over a period of time.

13. The method of claim 12, wherein the training includes detrending the data by subtracting off a value of an endpoint of a sequence from all other points in the sequence.

14. The method of claim 12, further comprising:
   normalizing the data after detrending using minimum and maximum values of all sequences of the data.

15. The method of claim 11, further comprising:
   optimizing the trained neural network architecture using a dynamic programing optimization method and the one or more outputs.

16. The method of claim 10, wherein the one or more outputs include an oil production rate and a water production rate.

17. The method of claim 10, wherein the virtual flow meter is accessible via a terminal by an operator of the injector well.

18. The method of claim 10, wherein the injector well and the producing well are a steam assisted gas drainage well pair.

* * * * *